United States Patent
Natarajan et al.

(10) Patent No.: US 10,476,797 B2
(45) Date of Patent: Nov. 12, 2019

(54) SYSTEMS AND METHODS TO ROUTE OVER A LINK AGGREGATION GROUP TO A TRUE NEXT HOP

(71) Applicant: DELL PRODUCTS L.P., Round Rock, TX (US)

(72) Inventors: Avinash Natarajan, Chennai (IN); Ramasubramani Mahadevan, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 203 days.

(21) Appl. No.: 14/685,369

(22) Filed: Apr. 13, 2015

(65) Prior Publication Data

US 2016/0301608 A1 Oct. 13, 2016

(51) Int. Cl.
| | |
|---|---|
| *H04L 12/911* | (2013.01) |
| *H04L 12/743* | (2013.01) |
| *H04L 12/741* | (2013.01) |
| *H04L 12/46* | (2006.01) |
| *H04L 12/28* | (2006.01) |
| *H04L 12/709* | (2013.01) |
| *H04L 12/707* | (2013.01) |

(52) U.S. Cl.
CPC ...... *H04L 45/7453* (2013.01); *H04L 12/2865* (2013.01); *H04L 12/4641* (2013.01); *H04L 45/54* (2013.01); *H04L 45/24* (2013.01); *H04L 45/245* (2013.01); *Y02D 30/30* (2018.01); *Y02D 50/30* (2018.01)

(58) Field of Classification Search
CPC .................................................... H04L 45/245
See application file for complete search history.

(56) References Cited

U.S. PATENT DOCUMENTS

| | | |
|---|---|---|
| 9,014,011 B2 | 4/2015 | Natarajan |
| 9,154,408 B2 | 10/2015 | Mahadevan |
| 9,264,308 B2 | 2/2016 | Anumala et al. |
| 9,264,347 B2 | 2/2016 | Anumala et al. |
| 9,276,815 B2 | 3/2016 | Anumala et al. |
| 9,288,105 B2 | 3/2016 | Anumala et al. |
| 9,288,138 B2 | 3/2016 | Ghanwani et al. |
| 9,379,945 B2 | 6/2016 | Janardhanan et al. |
| 9,473,389 B2 * | 10/2016 | Weldon ................ H04L 45/245 |
| 9,584,397 B2 | 2/2017 | Ghanwani et al. |
| 9,614,727 B2 | 4/2017 | Anumala et al. |
| 9,628,375 B2 | 4/2017 | Pathangi Janardhanan et al. |

(Continued)

*Primary Examiner* — Kevin M Cunningham
(74) *Attorney, Agent, or Firm* — North Weber & Baugh LLP

(57) ABSTRACT

Various embodiments of the invention allow for rapid communication in virtual link trunking (VLT) networks in which network traffic flows over not all-homed VLT peer devices, while honoring Equal Cost Multi Path (ECMP) decisions and normal route decisions about next hops. Traffic flow is made deterministic and free of sub-optimal paths that otherwise cause unnecessary traffic over inter-node links in the VLT domain. In embodiments, this is accomplished by using receiving VLAN interface-IP addresses from VLT devices in order to create and use a sub-LAG egress table from which sets of ports that lead to intended VLT devices are derived. In embodiments, instead of a VLAN interface-IP addresses a routing MAC address is used when forming the sub-LAG.

20 Claims, 7 Drawing Sheets

(56) References Cited

U.S. PATENT DOCUMENTS

| | | | |
|---|---|---|---|
| 2008/0031261 A1* | 2/2008 | Addeo | H04L 12/2602 370/395.53 |
| 2008/0151890 A1* | 6/2008 | Zelig | H04L 45/00 370/390 |
| 2011/0085570 A1* | 4/2011 | Kotha | H04L 45/245 370/419 |
| 2012/0033668 A1* | 2/2012 | Humphries | H04L 12/185 370/390 |
| 2012/0087372 A1* | 4/2012 | Narasimhan | H04L 45/245 370/392 |
| 2012/0134266 A1* | 5/2012 | Roitshtein | H04L 47/125 370/230 |
| 2012/0275297 A1* | 11/2012 | Subramanian | H04L 45/245 370/225 |
| 2013/0287020 A1* | 10/2013 | York | H04L 45/245 370/389 |
| 2014/0133486 A1 | 5/2014 | Sivasankar et al. | |
| 2014/0152837 A1* | 6/2014 | Hiramatsu | H04N 7/181 348/159 |
| 2014/0219081 A1 | 8/2014 | Natarajan et al. | |
| 2014/0241146 A1 | 8/2014 | Mahadevan et al. | |
| 2014/0369186 A1* | 12/2014 | Ernstrom | H04L 41/0668 370/228 |

\* cited by examiner

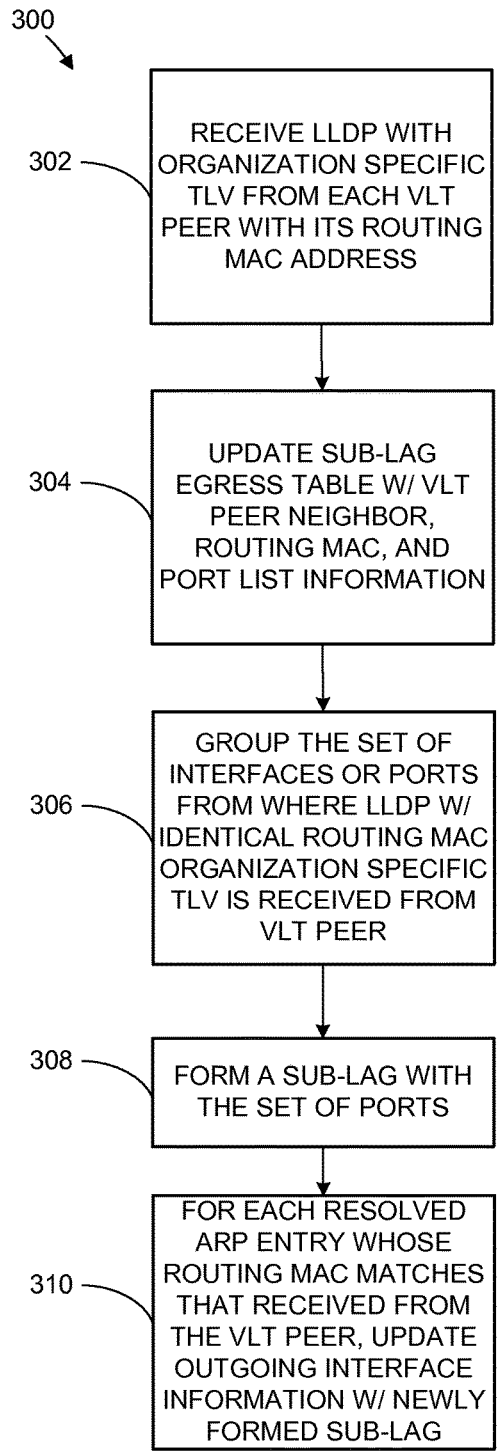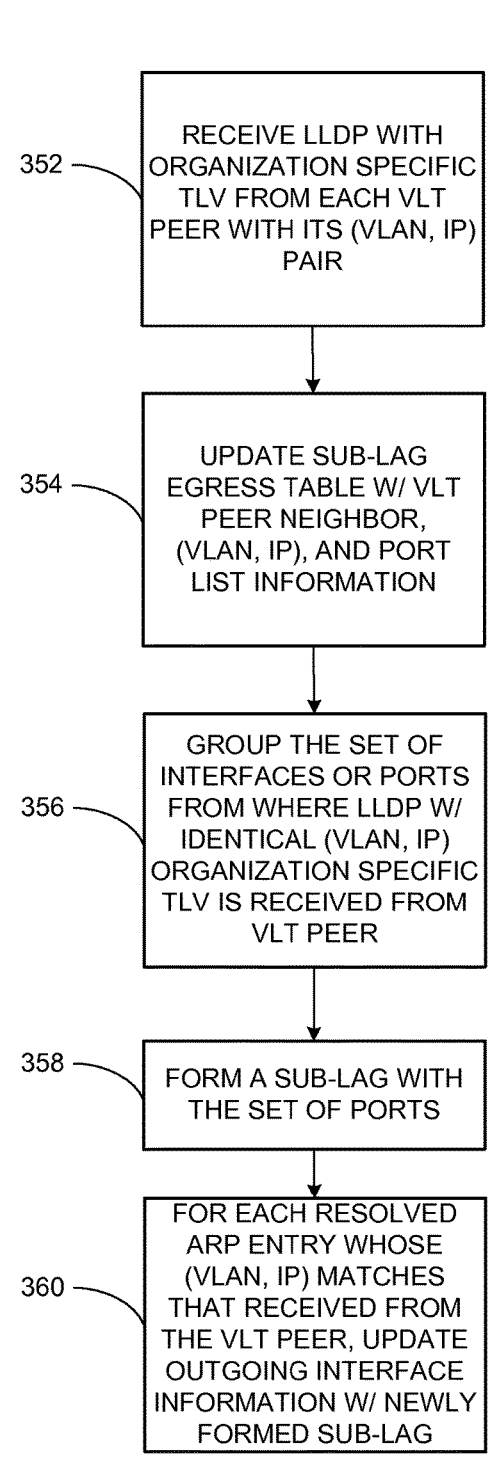
FIGURE 3A
FIGURE 3B

| LLDP Neighbor | ROUTING MAC ADDRESS | Port List | Sub - LAG |
|---|---|---|---|
| VLT Peer X | M1 | 0, 1 | 100 |
| VLT Peer Y | M2 | 2, 3 | 101 |
| VLT Peer Z | M3 | 4, 5 | 102 |

FIGURE 4A

| LLDP Neighbor | (VLAN, IP Address) | Port List | Sub - LAG |
|---|---|---|---|
| VLT Peer X | ( Vlan 10, IP1) | 0, 1 | 100 |
| VLT Peer Y | ( Vlan 10, IP2) | 2, 3 | 101 |
| VLT Peer Z | ( Vlan 10, IP3) | 4, 5 | 102 |

FIGURE 4B

| IP ADDRESS | MAC ADDRRESS | INTERFACE |
|---|---|---|
| 10.1.1.1 | M1 | 100 |
| 10.1.1.2 | M2 | 200 |
| 10.1.1.3 | M3 | 300 |

FIGURE 4C

SYSTEMS AND METHODS TO ROUTE OVER A LINK AGGREGATION GROUP TO A TRUE NEXT HOP

BACKGROUND

A. Technical Field

The present invention relates to networks and, more particularly, to systems, devices, and methods of routing data in a multipathing domain, such as a Virtual Link Trunking (VLT) network configuration.

B. Background of the Invention

When transmitting packets of data using an aggregation interconnection, such as a VLT network, a router has generally no control over which of multiple possible peer devices in the VLT a particular packet will be hashed. If the packet is hashed over a device that is not multi-homed on all VLT peers, an additional hop over an interconnect link (ICL) is therefore likely to occur before the packet is sent to its intended destination. Also, since existing VLT routing and Link Aggregation Group (LAG) hashing are performed over the entirety of a VLT LAG, a packet may reach any next hop ignoring desirable equal-cost multi-path (ECMP) decisions.

FIG. 1 illustrates an existing VLT network with sub-optimal paths over next hops. Network 100 comprises 3-node VLT LAG domain 102 formed by a group of VLT peer devices 112-116, downstream device router A 130, upstream devices routers B 132 and C 134, and host H4 136. VLT peer devices X 112, Y 114, and Z 116 are network switching devices that couple to network nodes via router ports and forward or route traffic according to known data structures that contain routing information. Suitable data structures include routing and next hop tables, e.g., ARP tables that map IP address to routing MAC addresses and its outgoing ports. VLT peer device X 112, Y 114, and Z 116 may be coupled to each other, at their ports, via any number of network links, such as ICL 115.

As shown in FIG. 1, south-bound VLT LAG 120 comprises links that are connected between VLT peer device X 112, Y 114, and Z 116 and router A 130, such that router A 130 may view all VLT peer devices 112-116 as a single device or unit having combined ports for purposes of exchanging network traffic with a given destination, such as router A 130. In other words, router A 130 need not be concerned with which of VLT peer device 112-116 receives a data packet that router A 130 sends for performing the requested routing function on the packet. Similarly, north-bound VLT LAG 122 comprises links that connect router B 132 to VLT peer X 112 and Y 114, i.e., router B 132 is multi-homed on VLT peer X 112 and Y 114, but is not directly coupled to VLT peer Z 116. VLT LAG 124 comprises links that connect router C 134 to VLT peer X 112 and Z 116, i.e., router C 132 is multi-homed on VLT peer X 112 and Z 116, but not on VLT peer Y 114. Routers B 132 and C 134 are coupled to destinations host H2 140 and host H3 142, respectively. Orphan port 126 is directly connected to host H4 136. In other words, devices that are connected to a VLT LAG are not necessarily also multi-homed.

In operation, when a packet is to be forwarded from router A 130 to router B 132 intended for host H2 140 or from router A 130 to router C 134 via VLT domain 102 to final destination host H3 142, and if router A 130 LAG-hashes network traffic to VLT peer Z 116, then router A 130 has no control over which of VLT peers 112-116 the packet will be actually transmitted. In scenarios where the data packet is directed to VLT peer Z 116, an unnecessary additional hop along ICL 115 will be required to carry traffic to VLT peer Y 114 before the packet can then be transmitted to router B 132. This creates sub-optimal paths that tends to oversubscribe ICL 113, 115.

Similarly, any traffic from host H1 144 destined for host H4 136 could get LAG-hashed alternatively to ports on VLT peer X 112 or Y 114, again, requiring that ICL 113, 115 be utilized to carry network traffic. In short, in scenarios where traffic is hashed to VLT peer Z 116, an additional hop over ICL 115 has to be utilized to detour the traffic to peer Y 114 before data packets can be delivered to router B 132.

In fact, in an N-node VLT domain with N>2 there is a likelihood that VLT devices 130-136 at the termination of a VLT LAG are not multi-homed on all VLT peers 112-116. Even for 2-node VLT systems, current VLT routing does not guarantee that a packet is routed to the actual next hop, because it is LAG hashing on the VLT that determines the actual next hop that a packet will reach, i.e., which ports coupled to corresponding network links the hashing mechanism will choose to forward any given packet. Thus, sub-optimal network paths may result any time the destination device or an intermediate router is single-homed.

Further, although both L3-routing and ECMP view individual VLT peers 112-116 as next hops, since LAG hashing takes priority over ECMP decisions, traffic may be directed to any of VLT peers 112-116 irrespective of ECMP decisions in favor of LAG hashing.

Therefore, it would be desirable to have systems and methods that honor ECMP decisions while avoiding the creation sub-optimal network paths in networks where the entire VLT LAG is used to perform VLT routing and LAG hashing.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

FIG. 3A is a flowchart illustrating a routing MAC-based generation of a sub-LAG egress table using the VLT network in FIG. 2, according various embodiments of the invention.

FIG. 3B is a flowchart illustrating a VLAN/IP based generation of a sub-LAG egress table using the VLT network in FIG. 2, according various embodiments of the invention.

FIGS. 4A and 4B illustrate exemplary sub-LAG egress tables according to various embodiments of the invention.

FIG. 4C illustrates an exemplary ARP table in accordance with various embodiments of the invention.

DETAILED DESCRIPTION OF THE PREFERRED EMBODIMENTS

Figure 1:
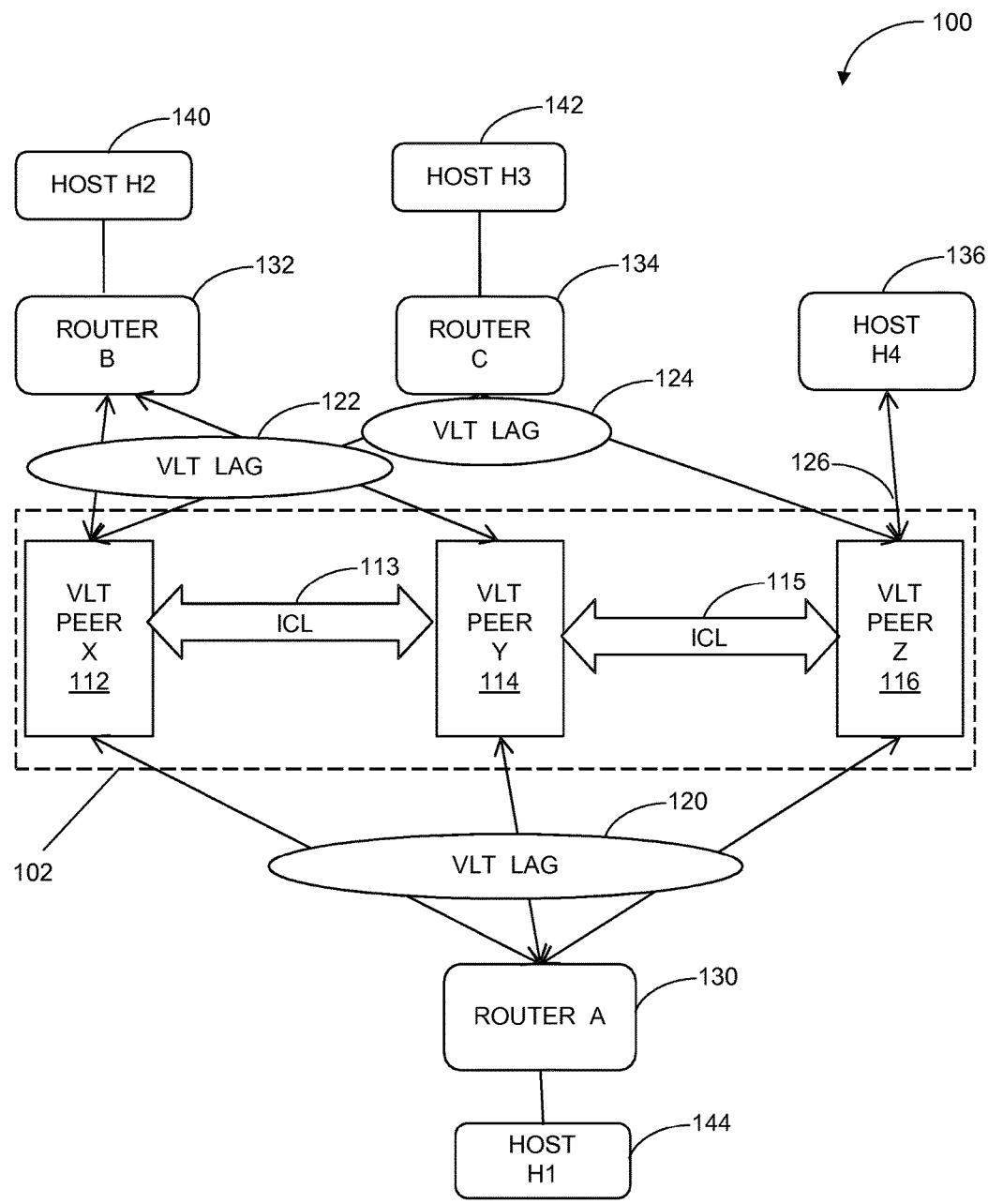
FIG. 1 shows an existing VLT network with sub-optimal paths over next hops.

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "In embodiments," "in an embodiment," or the like in various places in the specification are not necessarily referring to the same embodiment.

The terms "packet," "datagram," "segment," or "frame" shall be understood to mean a group of bits that can be transported across a network. These terms shall not be interpreted as limiting embodiments of the present invention to particular layers (e.g., Layer 2 networks, Layer 3 networks, etc.); and, these terms along with similar terms such as "data," "data traffic," "information," "cell," etc. may be replaced by other terminologies referring to a group of bits, and may be used interchangeably.

Embodiments of the present invention presented herein will be described using virtual link trunking (VLT) terminology. These examples are provided by way of illustration and not by way of limitation. One skilled in the art shall also recognize the general applicability of the present inventions to other applications and to other similar technologies that are called by different names. For example, a number of different vendors have implemented their own versions or VLT or VLT-like technologies. For example, Dell Force 10 markets Virtual Link Trunking (VLT). Cisco markets EtherChannel and Port Aggregation Protocol (along with its related Virtual Switching System (VSS), virtual PortChannel (vPC), Multichassis EtherChannel (MEC), and Multichassis Link Aggregation (MLAG)). Avaya markets Multi-Link Trunking (MLT), Split Multi-Link Trunking (SMLT), Routed Split Multi-Link Trunking (RSMLT), and Distributed Split Multi-Link Trunking (DSMLT). ZTE markets "Smartgroup" and Huawei markets "EtherTrunks." Other vendors provide similar offerings. A standard for this technology is under development in the IEEE 802.1 standards committee; the project is called distributed resilient network interconnect (DRNI). Accordingly, references to VLT herein shall be read generally as any similar aggregation/multipathing technology.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Furthermore, it shall be noted that: (1) certain steps may optionally be performed; (2) steps may not be limited to the specific order set forth herein; (3) certain steps may be performed in different orders; and (4) certain steps may be done concurrently.

In this document, the terms "hop-to-sub-LAG mapping table," "sub-LAG egress table," "next hop-to-sub-LAG mapping table," and "egress table" are used interchangeably. The term "interface" as used with respect to an Address Resolution Protocol (ARP) table refers to a port or to a sub-LAG if a group of ports are members of the sub-LAG. The term "information handling system" (IHS) comprises any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, the IHS may be a personal computer (e.g., desktop or laptop), tablet computer, mobile device (e.g., personal digital assistant or smart phone), server (e.g., blade server or rack server), a network storage device, or any other suitable device and may vary in size, shape, performance, and functionality. The IHS may include random access memory, one or more processing resources, (e.g., CPU) or hardware or software control logic, ROM, and/or other types of nonvolatile memory. Additional components of the IHS may include one or more disk drives, one or more network ports for communicating with external devices as well as various input and output (I/O) devices, such as a keyboard, mouse, touchscreen and/or video display. The IHS may also include one or more buses operable to transmit communications between the various hardware components.

Figure 2:
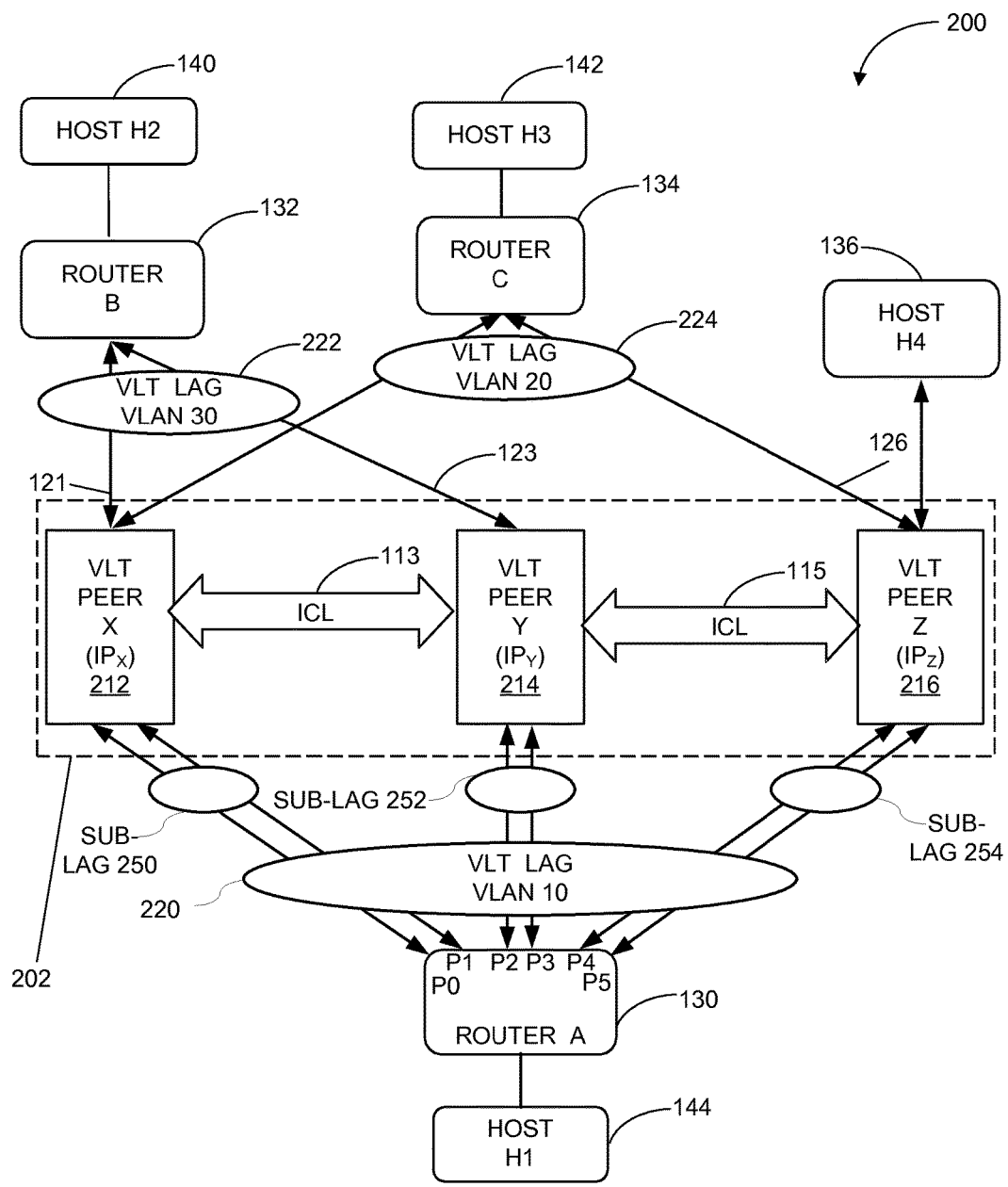
FIG. 2 illustrates an example VLT network that facilitates a routing scheme according to various embodiments of the invention.

FIG. 2 illustrates an example VLT network that facilitates a routing scheme according to various embodiments of the invention. Network 200 comprises 3-node VLT LAG domain 202 formed by a group of VLT peer devices 212-216. VLT peer devices 212-216 are coupled north-bound to VLT LAG 222 and 224 comprising VLAN 30 and VLAN 20, respectively. Also shown in FIG. 2, host H4 136 is coupled to VLT Peer Z 216 and south-bound VLT LAG 220 that comprises VLAN 10. Each VLT peer device X 212, Y 214, and Z 216 in VLT LAG domain 202 is connected to router A 130 via links that are members of respective sub-LAG 250, 252, and 254. It shall be noted that FIG. 2 is provided by way of example to help facilitate illustration of methods according to embodiments of the present invention. One skilled in the art shall recognize that aspects of the present invention may be applied to a vast array of different types of network configurations. For example, one skilled in the art will appreciate that although FIG. 2 displays network 200 in a 3-node VLT LAG domain configuration 202, any number of VLT peer devices having network links may be used and may be coupled to any number of network devices directly or via VLT LAGs. Further, routers 130-136 represent any network node, including switches or other information handling systems.

FIG. 3A is a flowchart illustrating a routing MAC-based generation of a sub-LAG egress table using the VLT network in FIG. 2, according various embodiments of the invention. The process for generating the sub-LAG egress table includes step 302 where packets from each VLT peer are received at a routing device, such as a router. In embodiments, the packets comprise LLDP with organization specific TLV and the VLT peer's routing MAC address.

At step 304, a sub-LAG egress table is updated with VLT peer neighbor, routing MAC, and port list information.

At step 306, the set of interfaces or ports from where LLDP with identical routing MAC organization specific TLV is received from VLT peer is grouped to form a sub-LAG at step 308.

At step 310, for each resolved ARP entry whose routing MAC matches that received from the VLT peer, the outgoing interface information with newly formed SUB-LAG is updated.

The sub-LAG egress table comprising sub-LAGs with unique sub-LAG IDs (e.g., 100-102) may be generated using a Link Layer Discovery Protocol (LLDP) mechanism. The LLDP format typically supports an organization-specific TLV (type-length-value).

FIG. 3B is a flowchart illustrating a VLAN/IP based generation of a sub-LAG egress table using the VLT network in FIG. 2, according various embodiments of the invention. In embodiments, each routing information may comprise a VLAN ID and a VLT peer device IP address. Process 350 for generating the sub-LAG egress table includes step 352 where packets from each VLT peer are received at a routing device, such as a router. In embodiments, the packets comprise LLDP with organization specific TLV and the VLT peer's (VLAN, IP) pair information.

At step 354, a sub-LAG egress table is updated with VLT peer neighbor, (VLAN, IP) pair, and port list information.

At step 356, the set of interfaces or ports from where LLDP with identical (VLAN, IP) pair organization specific TLV is received from VLT peer is grouped to form a sub-LAG at step 358.

It will be appreciated by those skilled in the art that additional steps may be incorporated with the steps illustrated herein without departing from the scope of the invention. Packets may be sent from any physical interface. For example, router A 130 in FIG. 2 may send out packets from ports 0-5 and, similarly, LLDP-enabled VLT peer devices 212-216 may send out LLDP packets from physical ports. Each physical interface or routing interface (e.g., VLAN 10 220) may be associated with both a MAC address and an IP address, such that a physical interface having an IP address may also have a different MAC address.

In embodiments, the LLDP data units with organization-specific TLV are encoded in the MAC address and include in an LLDP specific TLV a unique routing MAC address for each VLT peer device 212-214 (e.g., M1 for VLT peer X 212), such that each set of links leading from VLT peer device 212-214 to router A 130 will receive LLDP packets associated with its respective VLT peer device 212-214. The organization-specific TLVs that point to a same MAC address, i.e., are associated with the same VLT peer device 212-214, point to the same physical layer. For example, two distinct links from VLT peer X 212 to router A will carry the LLDP packet on both links such that router A 130 receives LLDP data units on port 0 and 1 from VLT peer X 212.

Using the LLDP information, router A 130 may form a corresponding sub-LAG by bundling a set of links that connects to VLT peer X 212—a single physical device, —but does not lead to both VLT peer X 212 and VLT peer Y 214 at the same time. By extension, if an LLDP packet is received on N distinct links calling unique TLVs that carry the same MAC address, the N links may be bundled into a specific sub-LAG.

In embodiments, router A 130 associates this routing information with the identified sub-LAGs to generate a sub-LAG egress table that assigns a subset of ports and a sub-LAG ID to each sub-LAG. With the creation of the sub-LAG egress table with the routing information and sub-LAGs, it is known which output ports of router A 130 will reach VLT peer X 212.

FIG. 4A illustrates an exemplary sub-LAG egress table according to various embodiments of the invention. In embodiments, sub-LAG egress table 400 is used as an outgoing interface for ARP information to reach individual VLT devices. In example in FIG. 4A, table 400 is a sub-LAG egress LLDP egress table that comprises a column for storing routing MAC addresses 404 and a column for corresponding port lists 406 that each represent a subset of egress ports. Each egress port designates next hops within a path, wherein each next hop has a routing MAC address 404.

In embodiments, egress table 400 uses LLDP information to create sub-LAGs 408 that contain subsets of ports that lead to individual VLT devices. For example, VLT peer devices X-Z 422, 432, and 442 may have respective unique routing MAC addresses 424, 434, and 444 M1-M3 in an LLDP organization-specific TLV. VLT peer X 422 may send on ports 0 and 1 426 an LLDP packet with the same routing MAC address 424, M1, indicating that these two links 426 lead to a single physical device, VLT peer X 422, having that physical MAC address 424. In this example, sub-LAG 408 is formed using links 426 to identify the specific physical device, VLT peer X 422, and sub-LAG ID 100 428 is assigned to sub-LAG 408.

Similarly, VLT peer Y 432 sends on port 2 and 3 436 an LLDP packet with the identical routing MAC address 434, M2, indicating these two ports 436 are connected to a physical device identified by that physical MAC address. From this information a sub-LAG is formed and, again, sub-LAG ID 101 438 is assigned. For VLT peer Z 442 having MAC address M3 444 a sub-lag with ports 4 and 5 446 is formed and associated with sub-LAG ID 102 448. Packets ingressing at a router from any of VLT peer devices X-Z 422, 432, and 442 may be associated with a parent LAG (not shown) having a parent LAG ID that comprises all six ports 0-5.

The egress table in FIG. 4B enables a similar approach, except that instead of unique routing MAC addresses, VLAN and IP addresses 454 are used to identify port lists 456 that designate next hops to reach peer devices 452 having unique IP addresses. Egress table 450 comprises a column 452 for storing routing VLANs that the LLDP TLV carries with corresponding IP addresses of peer devices that have logical interfaces (here VLAN 10) assigned and a column for storing a corresponding ports list 476. As a result, a router may communicate only to VLAN 10 VLT on peer X 472, such that when the router resolves an ARP for a given next hop address learned through the routing protocol, it can receive the IP address IP1 on VLAN 10 and knows that it is trying to resolve the IP address for IP1 on VLAN 10. Similarly, a router (e.g., router B) coupled to VLAN 30 may assign a routing information (VLAN 30, IP 4) to VLT peer X and a routing information (VLAN 30, IP 5) to VLT peer Y.

Ports list 476 in table 450 in FIG. 4B includes a subset of egress ports that designate a next hop in a path to reach a given routing IP address. In embodiments, first, each of the logical interfaces of VLT peer devices 452 is configured in an organization-specific TLV to have a corresponding IP address that can serve as the next hop. For example, VLAN 10 is configured and an individual IP address IP1 (e.g., 10.1.1.1) is assigned to VLT peer X 472 at VLAN 10. Likewise, the configuration for VLT peer Y 482 uses the same VLAN 10 but is assigned a different IP address IP2 (e.g., 10.1.1.2), such that with respect to router A, the typical next hops in the VLT path to reach host 2 on VLAN 10 will be IP1 and IP2.

In embodiments, an organization-specific LLDP TLV will carry all VLANs and corresponding IP addresses 474. Since each of the IP addresses is LLDP information, a lookup in an ARP table will be based on LLDP information of the VLAN-IP combination. Paths matching sets of outgoing ports 0 and 1 476 then form single sub-LAG 478. In other words, in order to identify sub-LAG 458 for VLT peer device 472, instead of carrying a routing MAC address of the device 452, as was illustrated in FIG. 4A, for each VLAN, a specific data set comprising VLAN ID and corresponding IP address 454 is configured, as shown in FIG. 4B. This data set is used to identify sub-LAG 458 leading to a particular VLT device. In this example, a specific sub-LAG 458 is formed for any two ports 456 (e.g., 0 and 1) that carry the same LLDP packet and organization-specific TLV content. One skilled in the art will appreciate that, depending on network configuration, tables 400 and 450 may comprise rows and columns for any number of VLT peer devices, addresses, pairs, port lists, sub-LAGs, to associate information contained in two or more columns with each other.

It is noted that in organization-specific LLDP TLV only one unique routing MAC address is included per logical interface or VLAN even if, for example, a router may house one unique MAC address per routing interface. In such instances, this embodiment may provide no mechanism to identify multiple MAC addresses for all VLANs, e.g., when each VLT peer device 422-442 sends out only one unique routing MAC address per switch. Therefore, when peer device 422-442 receives a packet with that MAC address, it may not be able to correctly identify each sub-LAG when performing its IP lookup in preparation to routing a packet.

Once sub-LAGs are identified in the egress table, they may be used to program an ARP table of a router, for example, when processing an ARP response to resolve requests. Address resolution generally requires that for each IP address a corresponding MAC address be known. At the control plane level, where information about routes is learned by inspecting data traffic, once an ARP response is received, the MAC address can be determined therefrom.

Figure 5:
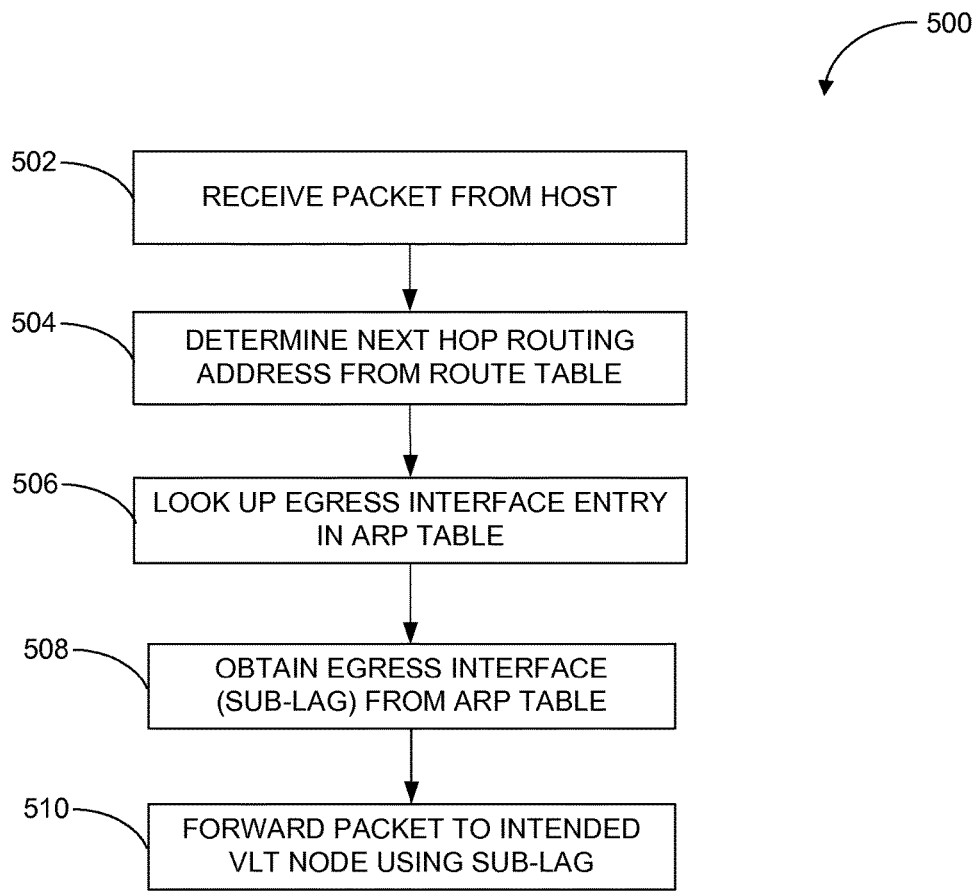
FIG. 5 is a flowchart illustrating the use of an ARP table according to various embodiments of the invention.

FIG. 5 is a flowchart illustrating the use of an ARP table according to various embodiments of the invention. The process for using the ARP egress table begins, at step 502, when packets are received, for example, at a routing device from a host sending the packet to an intended host in a network path.

At step 504, a next hop routing address is determined from a route table that may be stored in memory.

Based on the next hop routing address, at step 506, an egress interface entry is looked up in an ARP table. In embodiments, the egress interface entry corresponds to the routing information previously mentioned with respect to FIGS. 3A-B and 4A-C.

Once the entry is found in the ARP table, then, at step 508, the egress interface is determined from the ARP table.

Finally, at step 510, the sub-LAG is used for egress, for example, by forwarding packets to an intended VLT node. One skilled in the art will appreciate that fewer or additional steps may be incorporated with the steps illustrated herein, and that no particular order is implied by the arrangement of blocks within the flowchart or its description.

With reference to FIG. 2, assuming router A 130 knows that VLT peer X 212 is identified by IP address IPx (e.g., 10.1.1.1), then router A 130 also knows the corresponding MAC address (e.g., M1—the same MAC address that router A 130 already uses for the LLDP). In embodiments, router A 130 receives routing information in the ARP response and looks up a matching sub-LAG correspondence in a sub-LAG egress table. A lookup in LLDP egress table in FIG. 4A, for example, reveals that MAC address M1 424 refers to VLT peer X, port list (0,1) 426, and a sub-LAG having sub-LAG ID 100 428. Router A may use that information to build its ARP table and attempt to resolve the ARP for a given next hop address learned through the routing protocol.

FIG. 4C illustrates an exemplary ARP table according to various embodiments of the invention. In addition to information about IP-to-MAC mapping, ARP table 480 comprises information about egress interface 414, e.g., a sub-LAG coupled to the next hop for which the ARP is resolved. In embodiments, router A places the looked-up sub-LAG information 464 into its hardware ARP table 480 such that physical interfaces 414 corresponding to a sub-LAG may be used as next hop routing information, for example, to point to sub-LAG 200 464, which as learned from VLT peer X comprises outgoing ports 0 and 1. For each ARP that is resolved per VLAN, the corresponding routing MAC address 462 may be looked up in the egress table and the port list for each sub-LAG 464 may be derived based on that address.

In embodiments, pointing to the sub-LAG is not based on a MAC address for an IP address on a particular VLAN as in FIG. 4A, but rather on the routing information of the VLAN10-IPx combination (illustrated in FIG. 4B) that the router tries to resolve. As a result, when trying to resolve ARP on VLAN10 for a given next hop address, e.g., VLT peer X at address IP1 474, upon receiving an ARP response, instead of using the MAC address for IP1 to look up a corresponding port list in the egress table, the VLAN-IP address combination 454 is used to look up the port list, so that the corresponding sub-LAG can be obtained based on the combination.

Finally, information about egress interface can be programmed into the ARP table, written into the hardware of router A, and made available for subsequent packets as an outgoing port for the ARP information to serve as next hop. Programming the ARP table into the hardware forces packets to be sent via a given VLT peer device to use a particular one of the sub-LAGs that leads to the corresponding VLT peer device.

In embodiments, for each of the parent port channels on which the ARP response would have been received, the parent port channel is replaced with a sub-LAG, such that traffic destined for forwarding to the VLT peer points to the corresponding sub-LAG instead of pointing to the parent port channel. In FIG. 2, for example, instead of pointing to parent VLT LAG 220 that includes all ports 0-5 of router A 130 and, thus, includes a path to VLT peer Z 216, VLT peer X 212 may be programmed to identify a particular sub-LAG comprising member ports to ensure that the packet will directly flow, for example, to VLT peer X 212, and not to VLT peer Y 214 or VLT peer Z 216 before the packet is routed to destination host H2 140. Similarly, if VLT peer Y 214 is elected to reach host H2 140, the sub-LAG to which VLT peer Y 214 may be programmed will ensure that the packet flows to VLT peer Y 214 prior to being routed to router B 132, which then forwards the packet to destination host H2 140.

An ARP response from, e.g., VLT peer Y received with a MAC address M2 (as identified in LLDP egress table FIG. 4A, and that would otherwise be associated with the parent port channel in the control plane) may be used to look up in table 400 that M2 MAC address 434 corresponds to VLT peer Y and identifies sub-LAG 101 438. Sub-LAG 101 438 may then be programmed into an ARP table in order to point to ports 2 and 3 436 that can reach VLT peer Y 214 (e.g., 10.1.1.2). In short, from information learned when an ARP response containing a device's MAC address is received, VLT content that is based on routing MAC address 404 is looked up, sub-LAG 408 is identified, and the router updates the ARP table to have its interface column point to a sub-LAG 408 instead of a parent LAG that includes all ports of the router.

As a result, the ARP response sent by VLT peer X 212 in FIG. 2, for example, will be received on router A 130 sent from hardware associated with the appropriate ports with the effect that when router A 130 performs load balancing, VLT peer Z 216 is excluded as a possible path to route the packet to host H2 140, while network 200 continues to honor ECMP routing decisions and is not prone to looping issues. In other words, VLT peer Z 216 is not involved, at all, as might happen if VLT LAG 220 were identified instead of a sub-LAG.

In contrast, prior art routing schemes use a parent VLT LAG that includes all ports 0-5 of router A 130. However, the parent VLT LAG has no control over which of VLT peers 212-216 a particular packet is sent. Therefore, existing designs may disadvantageously choose VLT peer Z 216 to route the packet to host H2 140. Such a detour over a sub-optimal path, however, unnecessarily increases network processing that adds delay.

In embodiments, incoming traffic at router A 130 from any of VLT devices 212-216 is associated with parent VLT LAG 220 while leaving the ingress LAG table unmodified. As a result, broadcast traffic is prevented from looping back to any of VLT peer devices 212-216. It is noted that even if sub-LAG 250-254 may be associated with multiple ports (e.g., sub-LAG 252 comprises ports 0 and 1), this has no harmful effect as all ports sub-LAG 250-254 may direct network traffic to the same physical device and not to any other device before packets are then routed to a router that forwards the packets to the desired host. In this manner, the traffic to a destination pointed to by an intended next hop will be used, thereby, avoiding oversubscription of ICL links.

In embodiments, in case of a failure in the sub-LAG links, the ARP entries are updated with reassigned entries that point to the parent VLT LAG, such that traffic can be forwarded via the parent VLT LAG to ensure packets still reach their intended destination.

Figure 6:
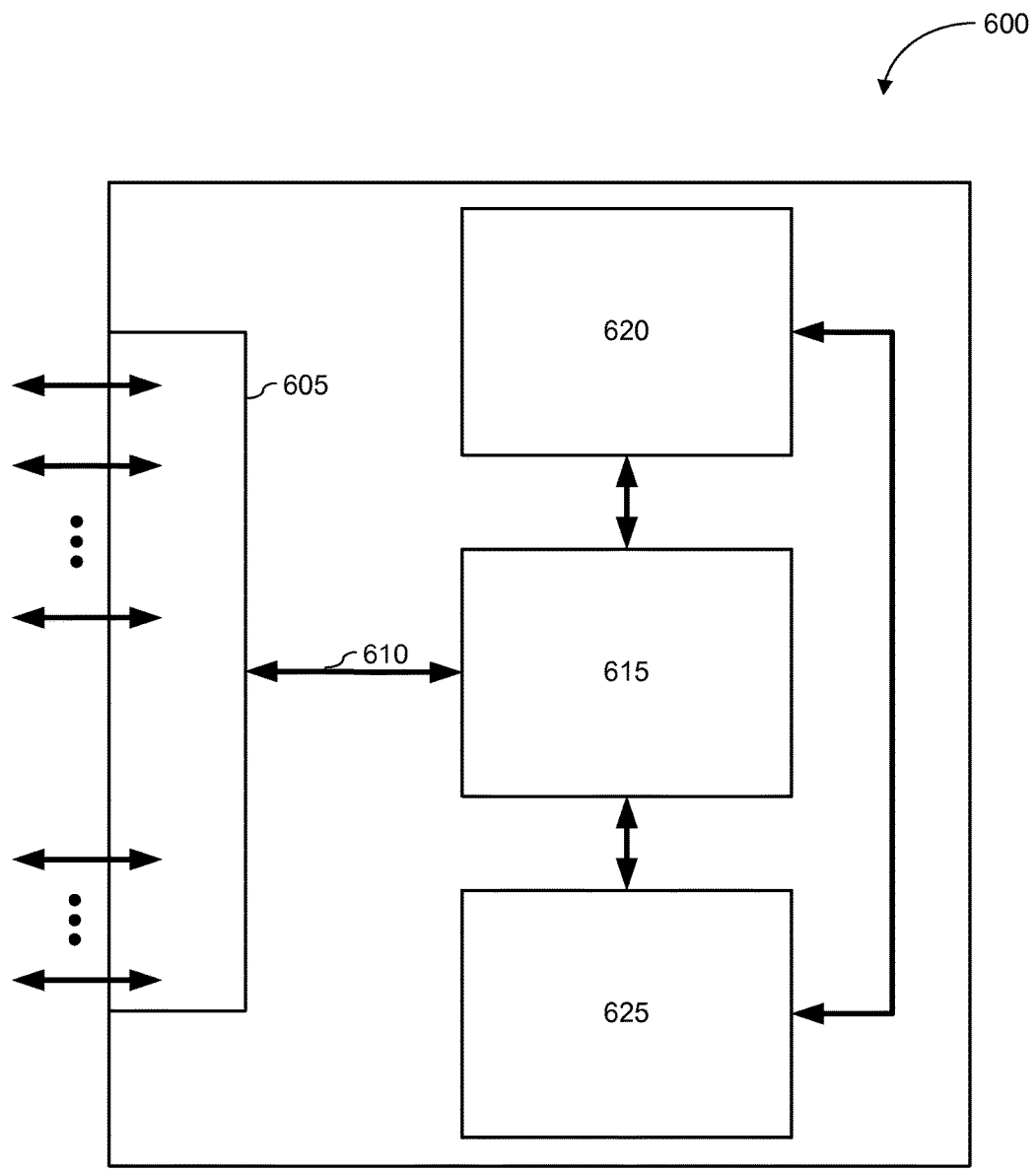
FIG. 6 depicts a simplified block diagram of an information handling system according to various embodiments of the present invention.

FIG. 6 depicts a simplified block diagram of an information handling system according to various embodiments of the present invention. It is understood that the functionalities shown for device 600 may operate to support various embodiments of an IHS (or node)—although it is understood that an IHS may be differently configured and include different components. IHS 600 may include a plurality of I/O ports 605, bus 610, network processing unit (NPU) 615, one or more tables 620, and CPU 625. The system includes a power supply (not shown) and may also include other components, which are not shown for sake of simplicity.

In embodiments, I/O ports 605 are connected via one or more cables to one or more other network devices or clients. Network processing unit 615 may use information included in the network data received at node 600, as well as information stored in table 620, to identify a next hop for the network data, among other possible activities. In embodiments, a switching fabric then schedules the network data for propagation through the node to an egress port for transmission to the next hop.

It is noted that aspects of the present invention may be encoded on one or more non-transitory computer-readable media with instructions for one or more processors to cause steps to be performed. It is also noted that the non-transitory computer-readable media may include volatile and non-volatile memory. It is noted that alternative implementations are possible, including hardware and software/hardware implementations. Hardware-implemented functions may be realized using ASICs, programmable arrays, digital signal processing circuitry, and the like. Accordingly, the "means" terms in any claims are intended to cover both software and hardware implementations. Similarly, the term "computer-readable medium or media" as used herein includes software and/or hardware having a program of instructions embodied therein, or a combination thereof. With these implementation alternatives in mind, it is understood that the figures and accompanying description provide the functional information one skilled in the art would require to write program code (i.e., software) and/or to fabricate circuits (i.e., hardware) to perform the processing required.

One skilled in the art will recognize that no particular IHS, protocol, or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

We claim:

1. A method to facilitate routing to the actual next hop in Link Aggregation Group (LAG), the method comprising:
   receiving packets at a routing device from at least one node of a plurality of LAG peer nodes, each packet comprising a routing information;
   associating the routing information with a sub-LAG having a sub-LAG ID, the sub-LAG represents a subset of ports on the routing device and is associated with a parent LAG having a parent LAG ID;
   generating an egress table that associates the sub-LAG with the subset of ports and one or more LAG peer nodes from the plurality of LAG peer nodes, the sub-LAG having been formed by using Link Layer Discovery Protocol (LLDP) information to group a set of links that connect to a unique LAG peer node;
   in response to receiving a packet from a host, using the egress table to identify the actual next hop LAG peer node; and
   sending the packet on the identified sub-LAG to an intended network node using the sub-LAG ID.

2. The method according to claim 1, wherein the routing information comprises a VLAN ID and a LAG peer device IP address.

3. The method according to claim 2, wherein the packets comprise information in an organization-specific TLV.

4. The method according to claim 1, wherein sub-LAG has been formed in a setup phase.

5. A method to facilitate routing to the actual next hop in Link Aggregation Group (LAG), the method comprising:
   receiving, from a host, packets at a routing device in a path to an intended network node;
   determining a next hop routing address from a route table stored in memory;
   based on the next hop routing address, looking up in an Address Resolution Protocol (ARP) table an entry for an egress interface data, the egress interface data corresponding to a routing information;
   in response to receiving a packet from a host, determining from the egress interface data an egress interface that is associated with a sub-LAG having a sub-LAG ID, the sub-LAG is associated with a parent LAG that has a parent LAG ID;

identifying one or more ports communicatively coupled to one or more LAG peer nodes from the plurality of LAG peer nodes; and using the egress interface to send the packet on the sub-LAG to the intended network node using the sub-LAG ID, the sub-LAG having been formed by using Link layer Discovery Protocol (LLDP) information to group a set of links that connect to a unique LAG peer node.

6. The method according to claim 5, wherein the egress table allows for a predetermined destination IP an equal-cost multi-path (ECMP) decision to determine an ECMP routing path via an ECMP next hop.

7. The method according to claim 6, wherein the ECMP hashing decision determines a next hop that has the next hop routing address and is reachable via a single port, the single port being chosen from the sub-LAG via LAG hashing.

8. The method according to claim 5, further comprising adding the egress interface data to the ARP table.

9. The method according to claim 8, wherein adding the egress interface data to the ARP table comprises writing the sub-LAG ID into the ARP table to cause the ARP table to point to a sub-LAG that leads to the intended network node.

10. The method according to claim 5, wherein the egress interface data is associated with the sub-LAG ID.

11. The method according to claim 5, wherein the egress table is generated by:

receiving packets at a routing device from a plurality of LAG peer nodes, each packet comprising a routing information;

associating the routing information with a sub-LAG having a sub-LAG ID, the sub-LAG represents a subset of ports on the routing device; and generating an egress table that associates the routing information with the subset of ports and the sub-LAG.

12. The method according to claim 5, wherein the routing information comprises a VLAN ID and a peer device IP address.

13. The method according to claim 5, further comprising an ingress LAG table that associates ingress traffic with the parent LAG to receive ingress packets exclusively on the parent LAG to avoid L2 MAC address learning on sub-LAGs and avoid L2 MAC address moves between two or more sub-LAGs.

14. The method according to claim 5, further comprising updating the egress interface data to point to the parent LAG in instances of a failure by one or more sub-LAGs.

15. The method according to claim 5, wherein the egress interface data represents a subset of ports on the routing device, the subset of ports determining paths to a next hop having the next hop routing address.

16. The method according to claim 15, further comprising querying the egress table to determine the subset of ports.

17. The method according to claim 15, further comprising assigning at least one of the subset of ports using equal-cost multi-path (ECMP) hashing.

18. The method according to claim 15, wherein using the egress interface data comprises, based on the sub-LAG ID, assigning at least one of the subset of ports to forward the packets to reach a LAG peer node.

19. The method according to claim 18, wherein the LAG peer node is chosen as a next hop for a predetermined destination IP for the packets.

20. An information handling system to facilitate routing to the actual next hop comprising:

a plurality of input/output (I/O) ports, at least a portion of which are configurable to facilitate communications with one or more devices and configurable to be part of a link aggregation group (LAG);

one or more processors that are communicatively coupled to the plurality of I/O ports; and a non-transitory memory comprising one or more sequences of instructions which, when executed by at least one of the one or more processors, causes steps to be performed comprising:

receiving, from a host, packets at a routing device in a path to an indented network node;

determining a next hop routing address from a route table stored in memory;

based on the next hop routing address, looking up in an Address Resolution Protocol (ARP) table an entry for an egress interface, the entry for the egress interface corresponding to a routing information;

determining from the entry an egress interface that is associated with a sub-LAG that has a sub-Lag ID and that identifies one or more ports communicatively coupled to one or more LAG peer nodes from a plurality of LAG peer nodes, the sub-LAG having been formed by using Link Layer Discovery Protocol (LLDP) information to group a set of links that connect to a unique LAG peer node; and using the sub-LAG to send a packet to the intended network node, the sub-LAGs being associated with a parent LAG that has a parent LAG ID.

* * * * *